United States Patent
Shan et al.

(10) Patent No.: US 10,560,374 B2
(45) Date of Patent: Feb. 11, 2020

(54) METHODS AND APPARATUSES FOR FLEXIBLE MOBILE STEERING IN CELLULAR NETWORKS

(71) Applicant: INTEL IP CORPORATION, Santa Clara, CA (US)

(72) Inventors: Changhong Shan, Shanghai (CN); Muthaiah Venkatachalam, Beaverton, OR (US); Puneet Jain, Hillsboro, OR (US); Alexandre S. Stojanovski, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/512,511

(22) PCT Filed: Oct. 16, 2015

(86) PCT No.: PCT/US2015/055898
§ 371 (c)(1),
(2) Date: Mar. 17, 2017

(87) PCT Pub. No.: WO2016/061436
PCT Pub. Date: Apr. 21, 2016

(65) Prior Publication Data
US 2018/0375759 A1 Dec. 27, 2018

Related U.S. Application Data

(60) Provisional application No. 62/065,214, filed on Oct. 17, 2014.

(51) Int. Cl.
*H04L 12/721* (2013.01)
*H04W 28/02* (2009.01)
(Continued)

(52) U.S. Cl.
CPC .......... *H04L 45/38* (2013.01); *H04L 41/0893* (2013.01); *H04L 47/12* (2013.01);
(Continued)

(58) Field of Classification Search
CPC ..... H04L 45/38; H04L 41/0893; H04L 47/12; H04L 47/2483; H04L 43/0817; H04W 28/0289
See application file for complete search history.

(56) References Cited

U.S. PATENT DOCUMENTS 8,762,501 B2   6/2014  Kempf et al.
10,033,589 B1 * 7/2018  Batta ................... H04L 41/0893
(Continued)

FOREIGN PATENT DOCUMENTS

RU       2388044 C2     4/2010
WO    2013/170897 A1   11/2013

OTHER PUBLICATIONS

International Search Report and Written Opinion dated Apr. 19, 2016 from International Application No. PCT/US2015/055898, 23 pages.
(Continued)

*Primary Examiner* — Duc C Ho
(74) *Attorney, Agent, or Firm* — Fish & Richardson P.C.

(57) ABSTRACT

Embodiments of the present disclosure describe systems, devices, and methods for traffic steering in mobile networks. Various embodiments may include a service steering and control function to route a service dataflow through one or more service enablers based on service steering and control rules. Other embodiments may be described or claimed.

27 Claims, 8 Drawing Sheets

(51) Int. Cl.
*H04L 12/851* (2013.01)
*H04L 12/801* (2013.01)
*H04L 12/24* (2006.01)
*H04L 12/26* (2006.01)

(52) U.S. Cl.
CPC ..... *H04L 47/2483* (2013.01); *H04W 28/0289* (2013.01); *H04L 43/0817* (2013.01)

(56) References Cited

U.S. PATENT DOCUMENTS

| | | | |
|---|---|---|---|
| 2004/0049612 A1* | 3/2004 | Boyd | H04L 47/34 710/52 |
| 2008/0291923 A1 | 11/2008 | Back et al. | |
| 2010/0211666 A1* | 8/2010 | Kvernvik | H04L 41/0681 709/223 |
| 2011/0225306 A1 | 9/2011 | Delsesto et al. | |
| 2012/0002548 A1* | 1/2012 | Walstrom | H04L 65/1016 370/235 |
| 2014/0086177 A1 | 3/2014 | Adjakple et al. | |
| 2014/0269724 A1* | 9/2014 | Mehler | H04L 45/30 370/392 |
| 2017/0118127 A1* | 4/2017 | Finkelstein | H04L 47/2475 |

OTHER PUBLICATIONS

Intel et al., "SSF based Solution proposal for FMSS," SA WG2 Temporary Document (revision of S2-150065), SA WG2 Meeting #107, S2-150474, Agenda Item: 7.17, Jan. 26-30, 2015, Sorrento, Italy, 3 pages.
China Mobile et al., "Proposed WID for Flexible Mobile Service Steering (FMSS)," SA WG2 Meeting #105, S2-143038 (revision of S2-14xxxx), Agenda Item: 8.1, Oct. 13-17, 2014, Sapporo, Japan, 6 pages.
Haeffner et al., "Service Function Chaining Use Cases in Mobile Networks," Internet Engineering Task Force, IETF, Standard Working Draft, Internet Society (ISOC) 4, Rue Des Falaises Ch—1205, Jul. 4, 2014, Geneva, Switzerland, 23 pages.
3GPP, "Technical Specification Group Services and System Aspects; Study on Flexible Mobile Service Steering (FMSS) (Release 13)," 3GPP TR 22.808 V2.0.0 (Sep. 2014), LTE Advanced, 19 pages.
Allot Communications, "Service Awareness alternative 1a description," SA WG2 Temporary Document, 3GPP TSG SA WG2 Meeting #78, TD S2-101305, Agenda Item: 9.11, Feb. 22-26, 2010, San Francisco, USA, 9 pages.
CCSA Wireless Communication Technical Committee (TC5) TD-SCDMA/WCDMA Workgroup (WG9) Core Network Subworkgroup,"China Communications Standards Association," 3GPP TSG-SA WG1 Meeting #67, S1-143206, Aug. 18-22, 2014, Sophia Antipolis, France, 2 pages.
ZTE Corporation et al., "Use Case for Service Chain Status update," 3GPP TSG-SA WG1 Meeting #66, S1-141050, Agenda Item: 8.6, May 12-16, 2014, Sapporo, Japan, 2 pages.
Li et al., "Service Function Chaining (SFC) Control Plane Achitecture," Internet Engineering Task Force, IETF, Standard Working Draft, Internet Society (ISOC), Sep. 22, 2014, Geneva, Switzerland, 18 pages.
Lan et al., "Service Function Path Establishment," Internet Engineering Task Force, IETF, Standard Workign Draft, Internet Society (ISOC), Jul. 7, 2014, Geneva, Switzerland, 16 pages.
International Preliminary Report on Patentability dated Mar. 23, 2017 from International Application No. PCT/US2015/055898, 6 pages.
Japanese Patent Office—Notice of Reasons for Rejection dated May 8, 2018 from Japanese Patent Application No. 2017-517310, 7 pages.
Russian Patent Office—Office Action dated Jul. 20, 2018 from Russian Patent Application No. 2017108822, 6 pages.
Korean Patent Office—Notice of Preliminary Rejection dated Oct. 1, 2018 from Korean Patent Application No. 2017-7007267, 10 pages.
European Patent Office—Article 94(3) dated Mar. 21, 2019 from European Patent Application No. 15788517.9, 8 pages.

* cited by examiner

METHODS AND APPARATUSES FOR FLEXIBLE MOBILE STEERING IN CELLULAR NETWORKS

CROSS-REFERENCE TO RELATED APPLICATION

This present application is a national phase entry under 35 U.S.C. § 371 of International Application No. PCT/US2015/055898, filed Oct. 16, 2015, entitled "METHODS AND APPARATUSES FOR FLEXIBLE MOBILE STEERING IN CELLULAR NETWORKS", which claims priority to U.S. Patent Application No. 62/065,214 filed Oct. 17, 2014, entitled "Mobile Service Steering Solution." The entire disclosures of which are hereby incorporated by reference in their entireties.

FIELD

Embodiments of the present disclosure generally relate to the field of wireless communication, and more particularly, to methods and apparatuses for flexible mobile steering in cellular networks.

BACKGROUND

Studies on Flexible Mobile Service Steering (FMSS) are focused on potential requirements for supporting traffic classification and service chain selection capabilities per operator's policy in order to realize efficient and flexible mobile service steering in (S)Gi-LAN networks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrases "A or B," "A/B," and "A and/or B" mean (A), (B), or (A and B).

As used herein, the term "circuitry" refers to, is part of, or includes hardware components such as an application specific integrated circuit (ASIC), an electronic circuit, a logic circuit, a processor (shared, dedicated, or group) and/or memory (shared, dedicated, or group) that are configured to provide the described operations. In some embodiments, the circuitry may execute one or more software or firmware programs to provide at least some of the described operations. In some embodiments, the circuitry may be implemented in, or operations associated with the circuitry may be implemented by, one or more software or firmware modules. In some embodiments, circuitry may include logic, at least partially operable in hardware, to perform the described operations.

Illustrative embodiments of the present disclosure include, but are not limited to, methods, systems, computer-readable media, and apparatuses that may be used in services and system aspects for FMSS in various use cases in mobile broadband networks such as Long Term Evolution (LTE) and LTE-Advanced networks. As used herein, a reference to LTE may include LTE, LTE-A, or any other LTE versions unless otherwise indicated. Use cases described herein may include, but are not limited to: traffic classification and steering based on application characteristics; traffic steering based on user's subscription; and traffic steering based on network status.

Figure 1:
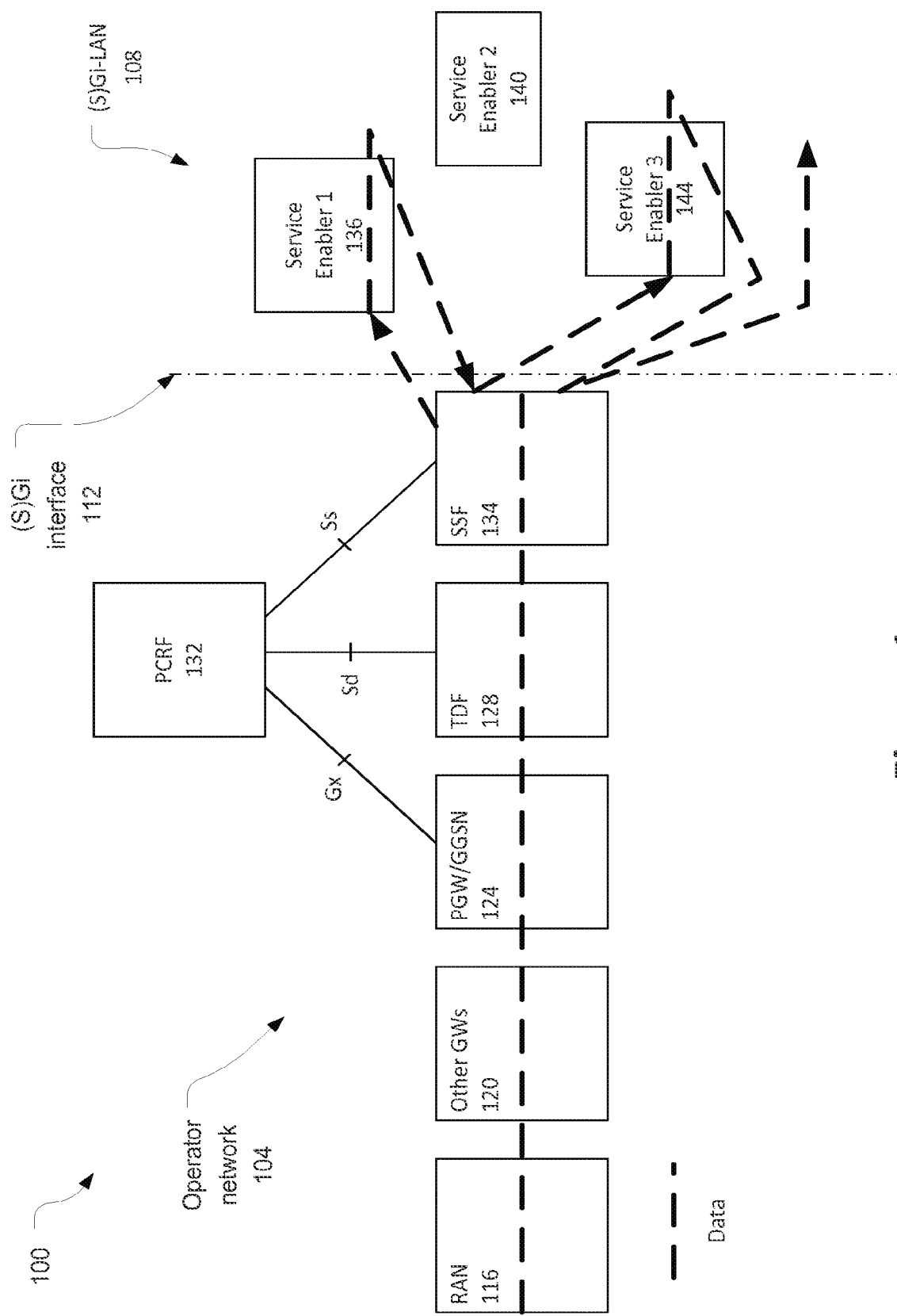
FIG. 1 illustrates a communication environment in accordance with some embodiments.

FIG. 1 schematically illustrates a communication environment 100 in accordance with various embodiments. The communication environment 100 may include components of an operator network 104 and components of a (S)Gi-local area network (LAN) network 108. The operator network 104 and the (S)Gi-LAN network 108 may communicate through a (S)Gi interface 112. A Gi interface may be the interface behind a GGSN-facing internet and a SiGi interface may be the interface behind a PGW-facing internet. For purposes of the present description, reference to a (S)Gi interface may generically refer to either interface. Likewise, reference to a (S)Gi-LAN may refer to either LAN.

The components of the communication environment 100 may be implemented in distinct devices, for example, servers, and may communicate with one another over external communication interfaces as generally shown. In some embodiments, one or more of the components of the communication environment 100 may be co-implemented in a single device. Some specific co-implementations are discussed herein, but others may also be used.

The operator network 104 may be an LTE network that includes, for example, a radio access network (RAN) 116 that provides a radio interface to user equipment (UE) communicatively coupled with the operator network 104. The RAN 116 may be coupled with a packet data network gateway (PGW)/gateway general packet radio service support node (GGSN) 124 through other gateways (GWs) 120 that may include, for example, a serving gateway.

The PGW/GGSN 124 may be the general gateway through which a UE may access a particular packet data network (PDN). The PGW/GGSN 124 may manage policy enforcement, packet filtration for users, and charging functions.

The PGW/GGSN 124 may be coupled with a traffic detection function (TDF) 128. The TDF 128 may provide the ability to detect service traffic based on subscriber, application, content, and device information. The TDF 128 may gate detected service traffic and block, permit, shape, or redirect the service traffic as necessary.

The PGW/GGSN 124 may be further coupled with a policy and charging rules function (PCRF) 132 over a Gx interface. The Gx interface may couple the PCRF 132 with a policy and charging enforcement function (PCEF) in the PGW/GGSN 124 and may be used by the PCRF 132 to provide policy and charging control (PCC) rules to, and remove PCC rules from, the PCEF. The PCC rules may provide for identifying a service dataflow (SDF) to facilitate provision of applicable charging parameters and policy control for the SDF. The Gx interface may also be used for the transmission of traffic plane events from the PCEF to the PCRF 132. The Gx interface may be consistent with definitions of the Gx interface provided in 3GPP Technical Specification (TS) 29.212 v12.6.0 (2014 Sep. 26).

Interfaces between various elements as described herein may be associated with respective communication protocols that facilitate the anticipated types of traffic conveyed over the respective interfaces. For example, various interfaces may provide protocols that support real-time transactions, stateless modes (for example, event-based charging), stateful modes (for example, session-based charging), reliability mechanisms, etc. depending on the particular needs of the traffic. In some embodiments, an interface may also be referred to as a reference point.

The TDF 128 may be coupled with the PCRF 132 over an Sd interface. The Sd interface may be used for transmitting a request for detection of service traffic from the PCRF 132 to the TDF 128. The request for detection of service traffic may include, for example, an application identifier. The Sd interface may further be used for reporting detection of service flows from the TDF 128 to the PCRF 132. The report of the detection of service flows may include, for example, service flow information. The Sd interface may be consistent with definitions of the Sd interface provided in 3GPP TS 29.212.

In some embodiments, the TDF 128 may be further coupled with a service steering function (SSF) 134. The SSF 134 may implement service steering and control (SSC) functions to receive and process requests to steer application traffic to specific service enablers (SEs) of the (S)Gi-LAN 108 and to apply the specified service steering enforcement and charging actions with respect to data that is being transmitted from or received by the operator network 104. The SSC functions may provide that a particular SDF be, for example, sequentially routed through a service chain of one or more service enablers (SEs) of the (S)Gi-LAN 108, for example, SE1 136, SE2 140, and SE3 144. The SSF 134 may communicate with the SEs over the (S)Gi interface 112.

The SSF 134 may be coupled with the PCRF 132 over an Ss interface. The Ss interface may facilitate provision of SSC rules to the SSF and may further facilitate provision of SE load information to the PCRF 132 as described herein.

While FIG. 1 shows the SSF 134 as a distinct element, in some embodiments, the SSF may be incorporated into the TDF 128 or, in the case of outbound traffic (for example, traffic being sent out from the operator network 104), in the PCEF of the PGW/GGSN 124. In embodiments in which the SFF 134 is in the PCEF, the SSC rule may be part of a policy and charging control (PCC) rule and in embodiments in which the SFF 134 is in the TDF 128 the SSC rule may be part of the application detection and control (ADC) rule.

The SEs of the (S)Gi-LAN 108 may provide specific processing functions that may be invoked to improve a user's quality of experience, reduce bandwidth pressure, or provide some other value-added service. In some embodiments, the SEs may include a URL filter (for example, to block unsafe or restricted web URLs), a video optimization process (for example, to adapt video resolution and bit rate according to a user's terminal), a protocol optimizer (for example, to use multipart or pipeline mechanism to optimize an HTTP protocol), a firewall, etc. The SEs may be disposed in discrete devices or a plurality of SEs may be co-disposed in a single device.

Figure 2:
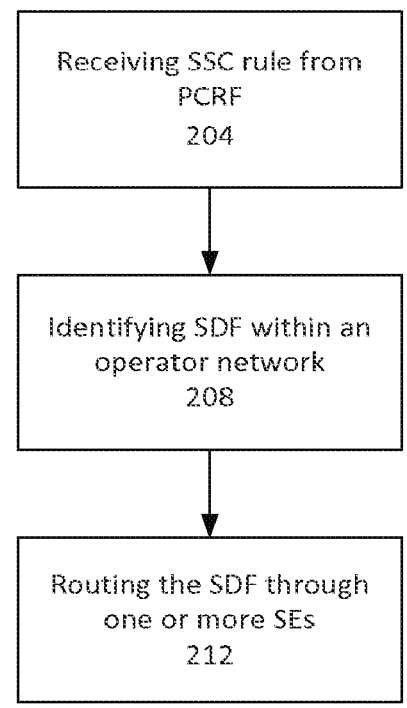
FIG. 2 is a flowchart of a steering process in accordance with some embodiments.

FIG. 2 illustrates a flowchart of a steering process 200 of the SSF 134 in accordance with some embodiments.

At 204, the steering process 200 may include receiving a set of SSC rules from the PCRF 132. The set of SSC rules may be received by the SSF 134 via the Ss interface.

An SSC rule may provide an indication of how a particular SDF, or portions thereof, should be routed through one or more SEs based on application characteristics, policies of the operator network 104, user subscription data, network status, time/location, quality of service (QoS) information, etc. For example, SSC rules may provide that data traffic generated from web browsing is to be routed through a service enabler that provides protocol optimization to improve the user's experience according to the operator's policy; high-priority data traffic may be routed to avoid advertisements; data traffic for a user having virus filtering enabled may be routed through a service enabler to check for viruses, malware, etc. and allow, block or decontaminate the traffic as appropriate; etc. Many specific routing scenarios and service enablers may be envisioned.

Individual SSC rules of the set of SSC rules received by the SSF 134 may include an SSC rule identifier, one or more application identifiers, one or more SDF identifiers, and one or more SE identifiers.

At 208, the steering process 200 may include identifying an SDF within an operator network. The SDF may be identified by matching an identifier received in setting up the SDF with the SDF identifier of the SSC rule. The SDF identifier may, in some embodiments, include a 5-tuple that identifies five different values that comprise a transmission control protocol/Internet protocol (TCP/IP) connection. The 5-tuple may include, for example, a source IP address and port number, a destination IP address and port number, and a protocol.

At 212, the steering process 200 may include routing the SDF through one or more SEs. The SSC rule may indicate that packets of a particular SDF should be routed through an ordered chain of a plurality of SEs identified by the SSC rule. For example, and with reference to FIG. 1, an SSC rule may indicate that the corresponding SDF should be routed first through SE1 136, then through SE3 144, and then released to components of the PDN, for example, routers, switches, etc., on toward its destination. The SSF 134 may enforce the SSC rules by causing packets of the SDF to be transmitted through the chain of SEs in the order defined by the SSC rule.

In some embodiments, enforcement of the SSC rule may be achieved using any type of layer-2 tunnels. Layer-2 tunnels include, but are not limited to, Ethernet tunnels, virtual local area network (VLAN) identifier (ID) tunnels, multiprotocol label switching (MPLS), and IP-in-IP tunnels. The SSF 134 may transmit an SDF to the SE1 136 through a layer-2 tunnel. After the SE1 136 provides its operations on the SDF, it may transmit the SDF back to the SSF 134 through the same layer-2 tunnel. Upon receipt of the SDF from the SE1 136, the SSF 134 may use a layer-2 tunnel hairpin to transmit the SDF to the next SE in the chain, e.g., SE3 144, or let the traffic out of the operator network 104.

Although FIG. 1 shows the rule being applied to outbound data, other embodiments may use the SSC rule for inbound data, for example, data coming into the operator network 104 from a PDN. In some embodiments, outbound and inbound traffic within the same SDF may be routed through the same set of SEs, with the inbound traffic being routed through the chain of SEs in a reverse order from the outbound traffic.

In some embodiments, the steering rules of the SSC rule may apply to all portions of the SDF. In other embodiments, the steering rules of an SSC rule may only apply to selected portions, for example, data or packets, of the SDF. For example, a set of application identifiers may be included in the SSC rule to identify those applications or class of applications that originate or terminate data of an SDF that is to be routed through the associated service enablers. Thus, in these embodiments, the SSC rule may only apply to selected portions of an SDF that corresponds to the identified applications.

In some embodiments, once the SSF 134 identifies the SDF at 208, it may mark the traffic in either the differentiated services code point (DSCP) of the inner or outer IP header of the network service header (NSH). This may provide the SEs of the service chain with QoS information to facilitate appropriate processing.

Figure 3:
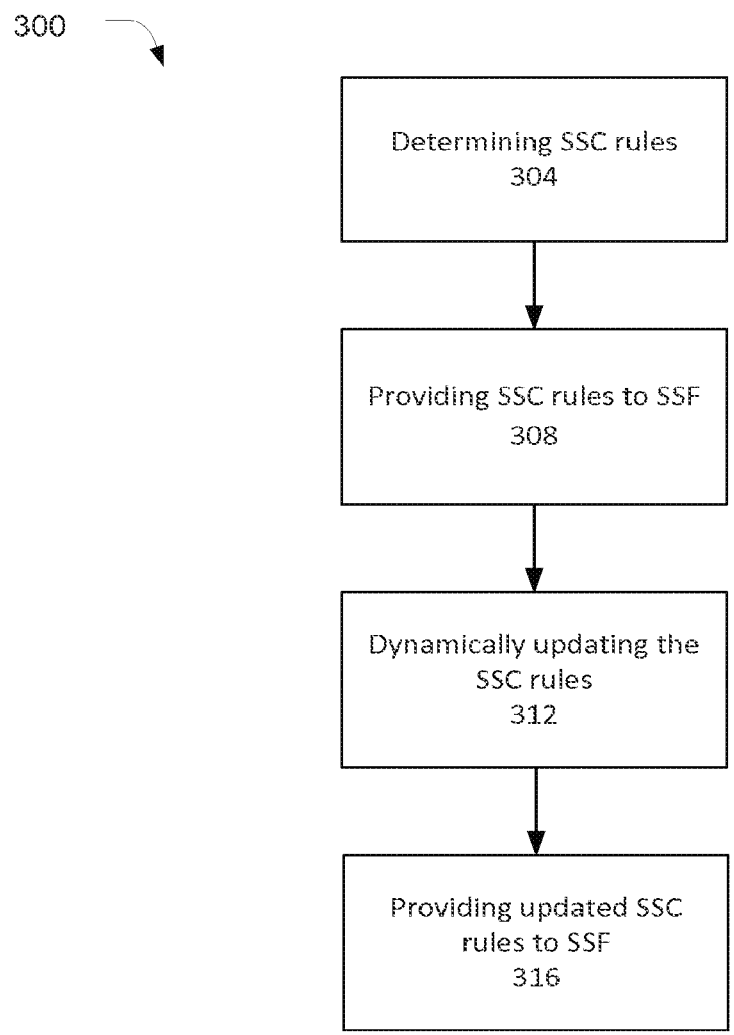
FIG. 3 is a flowchart of a rule-provisioning process in accordance with some embodiments.

FIG. 3 illustrates a flowchart of a rule-provisioning process 300 of the PCRF 132 in accordance with some embodiments. In some embodiments, the rule-provisioning process 300 may be instantiated when a subscriber initially connects or registers with the operator network 104.

At 304, the rule-provisioning process 300 may include determining SSC rules for the subscriber. In some embodiments, the SSC rules may be determined for a specific classification of application of the subscriber by taking into account the subscriber's profile. The PCRF 132 may receive user subscription data or other information (for example, quality of experience (QoE) information) upon which SSC rules may be based from an access network discovery and selection function (ANDSF) or home subscriber server/subscriber profile repository (HSS/SPR). In some embodiments, the SSC rules may be preconfigured at the PCRF 132. In other embodiments, the SSC rules may be preconfigured at the ANDSF or HSS/SPR and the PCRF 132 may retrieve the SSC rules as appropriate.

In embodiments in which the SSC rules are preconfigured at the ANDSF or the HSS/SPR, the SSF 134 may be configured to obtain the SSC rules directly from the ANDSF or the HSS/SPR, rather than from the PCRF 132. Such embodiments may include new interfaces between the SSF 134 and the ANDSF or the HSS/SPR to facilitate such communications.

At 308, the rule-provisioning process 300 may include providing the SSC rules to the SSF 134. The SSC rules may be provided to the SSF 134 over the Ss interface as discussed above.

At 312, the rule-provisioning process 300 may include dynamically updating the SSC rules. In some embodiments, the dynamic updating of the SSC rules may be triggered based on information received by the PCRF 132 regarding a change to the subscriber profile, operator policy, network environment, etc.

At 316, the rule-provisioning process 300 may include providing the updated SSC rules to the SSF 134 over the Ss interface. In some embodiments, the provision of the updated SSC rules may occur each time an SSC rule is updated. In other embodiments, the provision of the updated SSC rules may occur less frequently based on, for example, significance of the update, update schedule, etc.

In some embodiments, the SSC rule may be preconfigured at the SSF 134. In these embodiments, the PCRF 132 may still provide updates to the preconfigured SSC rule over the Ss interface as described above at 316 but may not need to provide the SSC rules originally at 308.

Figure 4:
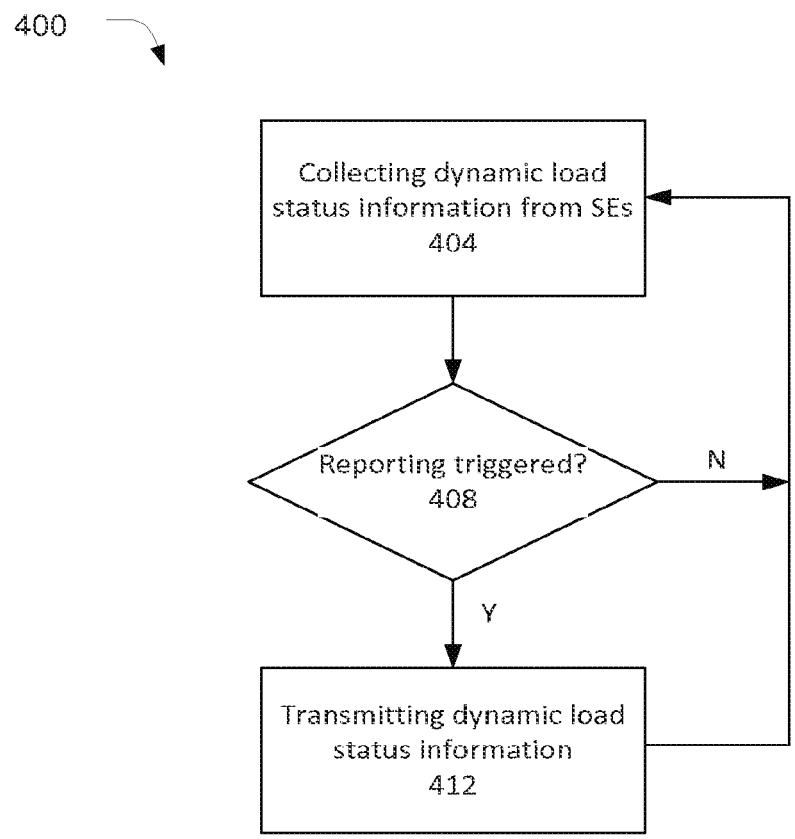
FIG. 4 is a flowchart of a reporting process in accordance with some embodiments.

FIG. 4 illustrates a flowchart of a reporting process 400 of the SSF 134 in accordance with some embodiments.

At 404, the reporting process 400 may include collecting dynamic load status information from the SEs. The dynamic load status information may be transmitted to the SSF 134 over the (S)Gi interface 112. In some embodiments, the SEs may periodically send their load status information to the SSF 134. In other embodiments, the SEs may send their load status information upon a change in status over a threshold amount.

In some embodiments, the load status information may be determined by the SSF 134 circumstantially. For example, the SSF 134 may determine the load status information based on the amount of traffic being directed to an SE, based on processing time of the SE, etc.

At 408, the reporting process 400 may include determining whether a reporting is triggered. In various embodiments, reports may be triggered periodically or upon an occurrence of an event, for example, upon receipt of load status information from the SE.

If, at 408, reporting is triggered, the reporting process 400 may advance to transmitting the dynamic load status information to the PCRF 132. The dynamic load status information may be transmitted from the SSF 134 to the PCRF 132 over the Ss interface.

After transmitting the dynamic load status at 412, or upon a determination that the reporting is not triggered at 408, the reporting process 400 may loop back to collecting dynamic load status information from SEs at 404.

Figure 5:
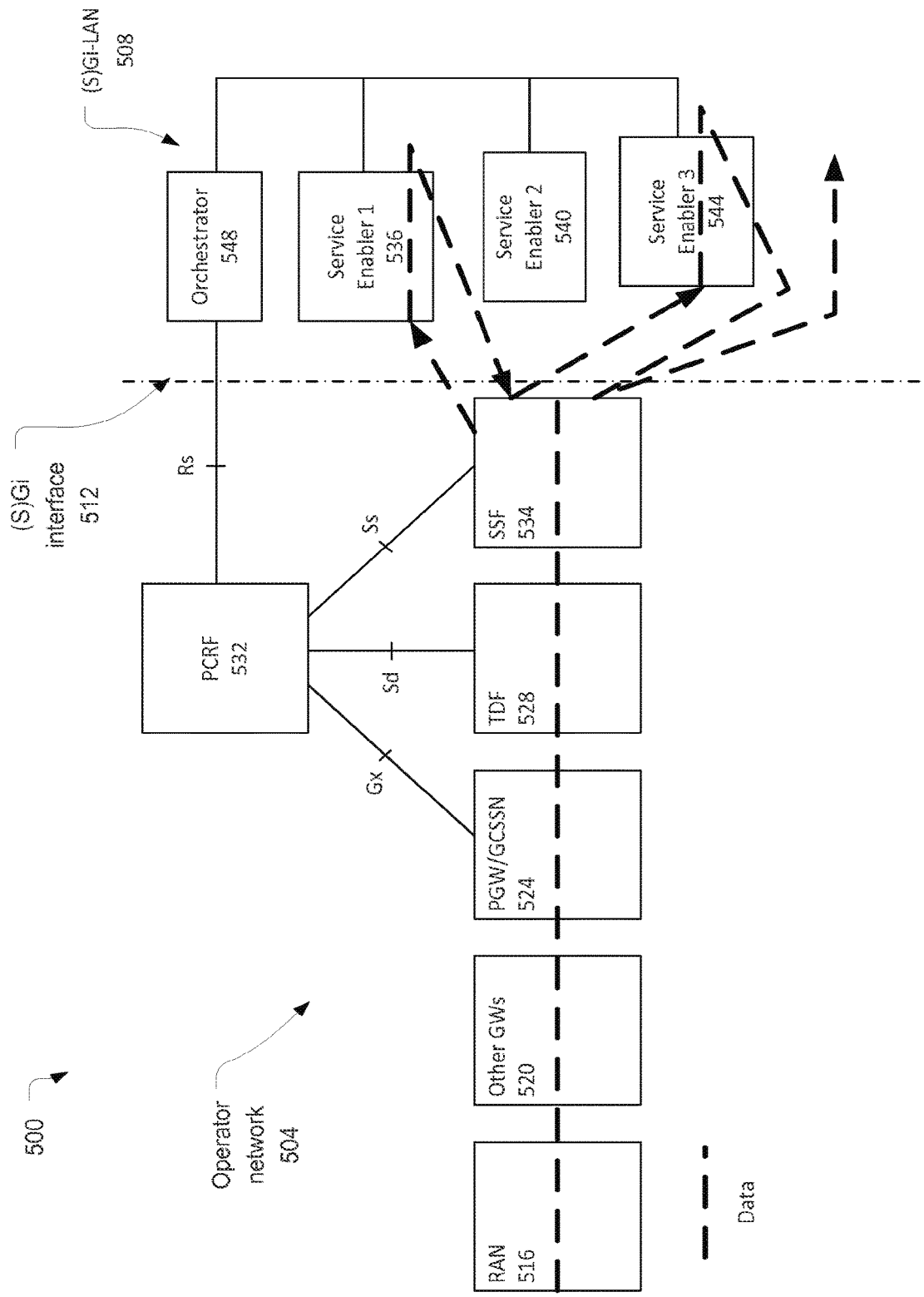
FIG. 5 illustrates a communication environment in accordance with some embodiments.

FIG. 5 illustrates a communication environment 500 in accordance with some embodiments. The components of the communication environment 500 may be similar to like-named components shown and described with respect to communication environment 100. However, the communication environment 500 may further include an orchestrator in the (S)Gi-LAN 508. In some embodiments, the orchestrator 548 may be part of an operations administration and management (OAM) server in the (S)Gi-LAN 508.

The orchestrator 548 may be coupled with the PCRF 532 via an Rs interface. The orchestrator 548 may further be coupled with the SEs of the (S)Gi-LAN 508. In some embodiments, the orchestrator 548 may perform the reporting process 400 in place of the SSF 134. That is, the orchestrator 548 may collect dynamic load status information from SEs at 404, determine whether a reporting is triggered at 408, and transmit dynamic load status information to the PCRF 532 at 412.

Figure 6:
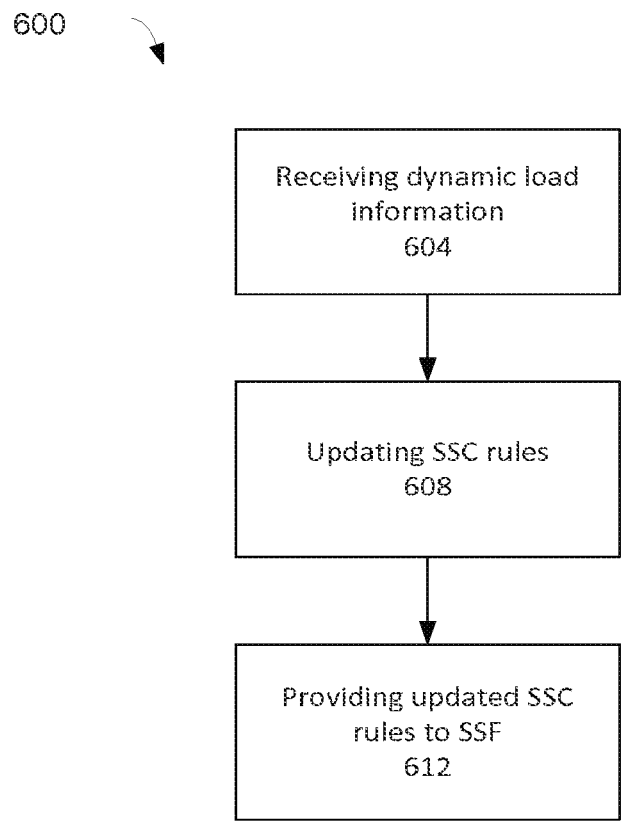
FIG. 6 is a flowchart of an updating process in accordance with some embodiments.

FIG. 6 illustrates a flowchart of an updating operation 600 of a PCRF in accordance with some embodiments. The updating operation 600 may be performed by PCRF 132 or PCRF 532.

At 604, the updating operation 600 may include receiving dynamic load information. As discussed above, the dynamic load information may be received from the SSF 134 over the Ss interface or may be received from the orchestrator 548 over the Rs interface. Further, the dynamic load information may be received on a periodic or event-based reporting interval.

At 608, the updating process 600 may include updating the SSC rules based on the dynamic load information received at 604. The PCRF may attempt to update the SSC rules in order to reduce a load on an overloaded SE. In some embodiments, this may be done by rerouting one or more data streams away from the overloaded SE. In some embodiments, the PCRF may update the SSC rules in order to more evenly distributed a load among available SEs.

At 612, the updating process 600 may include providing the updated SSC rules to an SSF (for example, SSF 134 or SSF 534). The updated SSC rules may be provided to the SSF over the Ss interface.

Figure 7:
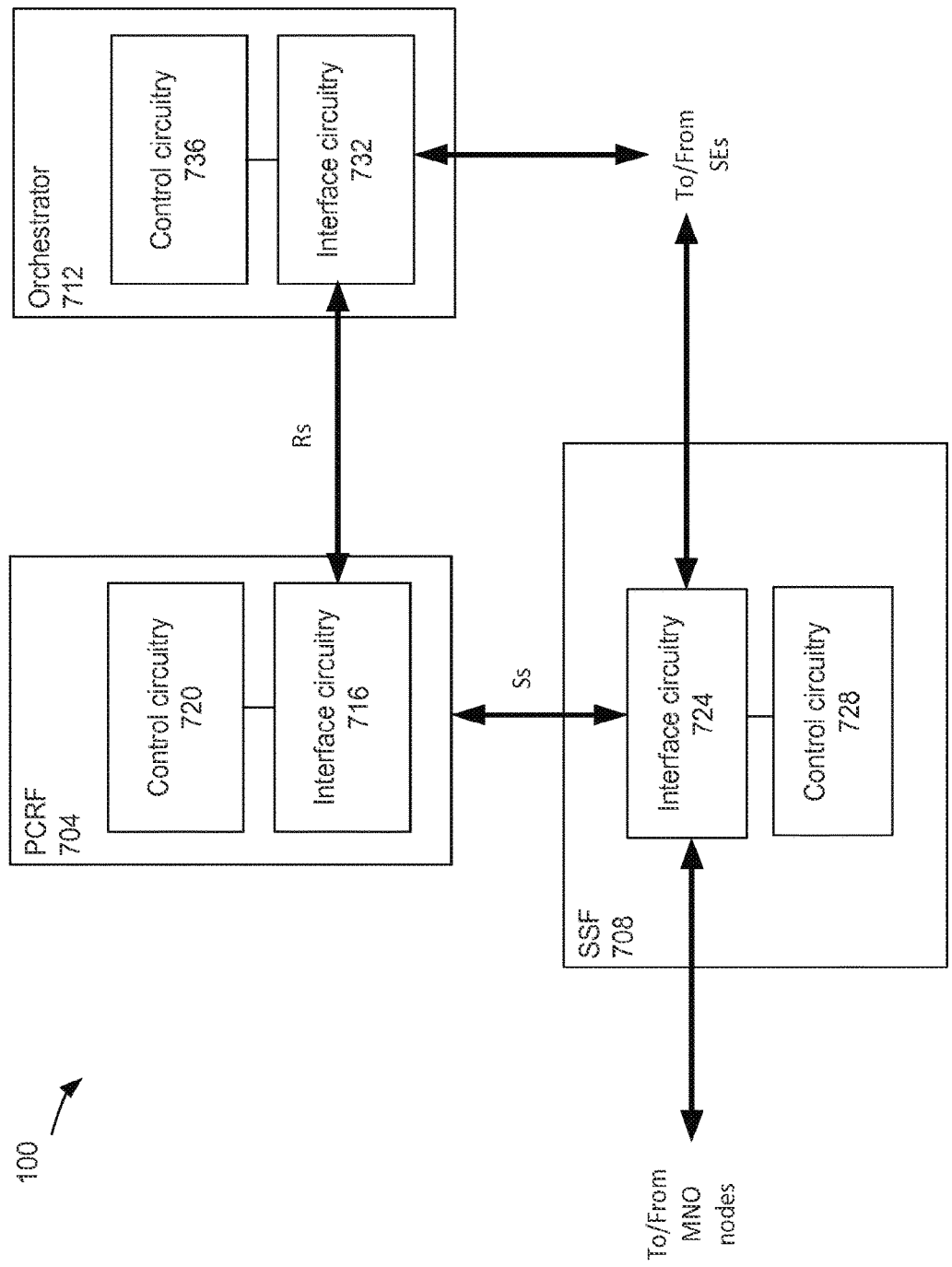
FIG. 7 illustrates components of a communication environment in accordance with some embodiments.

FIG. 7 illustrates components of a communication environment 700 in further detail. In particular, FIG. 7 illustrates a PCRF 704 coupled with an SSF 708 and, optionally, an orchestrator 712.

The PCRF 704 may be similar to, and substantially interchangeable with, PCRF 132 or PCRF 532. The PCRF 704 may include interface circuitry 716 coupled with control circuitry 720.

The interface circuitry 716 may be configured to communicate with other network entities over various interfaces using appropriate networking communication protocols. For example, in some embodiments the interface circuitry 716 may be configured to communicate with orchestrator 712 over an Rs interface using an Rs communication protocol. In particular, the interface circuitry 716 may receive dynamic load status information from the orchestrator 712.

The interface circuitry 716 may be additionally configured to communicate with the SSF 708 over an Ss interface using an Ss communication protocol. In particular, the interface circuitry 716 may transmit SSC rules or updates to the SSF 708 over the Ss interface and, in some embodiments, receive dynamic load information from the SSF over the Ss interface.

The interface circuitry 716 may provide information received from the orchestrator 712 or the SSF 708 to the control circuitry 720 for further, higher-layer processing. The interface circuitry 716 may also receive information from the control circuitry 720 that is to be transmitted over the Rs or Ss interfaces.

In some embodiments, the interface circuitry 716 may include first circuitry that is specifically configured for communication over the Rs interface and second circuitry that is specifically configured for communication over the Ss interface. In other embodiments, the same circuitry may be configured for communication over both the Rs and the Ss interfaces.

In some embodiments, the interface circuitry 716 may include one or more receive circuitry for inbound signals and may further include one or more transmit circuitry for outbound signals.

While not explicitly shown, the interface circuitry 716 may be further configured to communicate with other network nodes including, but not limited to, an ANDSF, HSS/SPR, etc.

The control circuitry 720 may be configured for providing higher-level PCRF operations as described in, for example, the rule-provisioning process 300 or the updating operation 600. For example, the control circuitry 720 may determine SSC rules and provide the SSC rules to the SSF 708 via the interface circuitry 716. The control circuitry 720 may further dynamically update the SSC rules, based on dynamic load information or other network or subscriber information, and provide the updates to the SSF 708 via the interface circuitry 716.

The SSF 708 may be similar to, and substantially interchangeable with, SSF 134 or SSF 534. The SSF 708 may include interface circuitry 724 coupled with control circuitry 728.

Similar to interface circuitry 716, the interface circuitry 724 may be configured to communicate with other network entities over various interfaces. For example, in some embodiments the interface circuitry 724 may be configured to communicate with the PCRF 704 over the Ss interface using the Ss communication protocol. In particular, the interface circuitry 724 may receive SSC rules from the PCRF 704 over the Ss interface and, in some embodiments, transmit dynamic load information to the PCRF 704 over the Ss interface.

The interface circuitry 724 may be additionally configured to communicate an SDF between components of an operator network (for example, a TDF, PGW/GGSN, etc.), SEs in a (S)Gi-LAN over a (S)Gi interface, and components of a PDN network.

The orchestrator 712 may be similar to, and substantially interchangeable with, orchestrator 548. The orchestrator 712 may include interface circuitry 732 coupled with control circuitry 736.

Similar to interface circuitry 716, the interface circuitry 732 may be configured to communicate with other network entities over various interfaces. For example, in some embodiments the interface circuitry 732 may be configured to communicate with the PCRF 704 over the Rs interface using the Rs communication protocol and may be further configured to communicate with the SEs. In particular, the interface circuitry 732 may receive dynamic load information from the SEs and convey the dynamic load information to the PCRF 704 over the Rs interface.

The interface circuitry 716, 724, and 732 may be capable of communicating over Ethernet or other computer networking technologies using a variety of physical media interfaces such as, but not limited to, coaxial, twisted-pair, and fiber-optic media interfaces.

Figure 8:
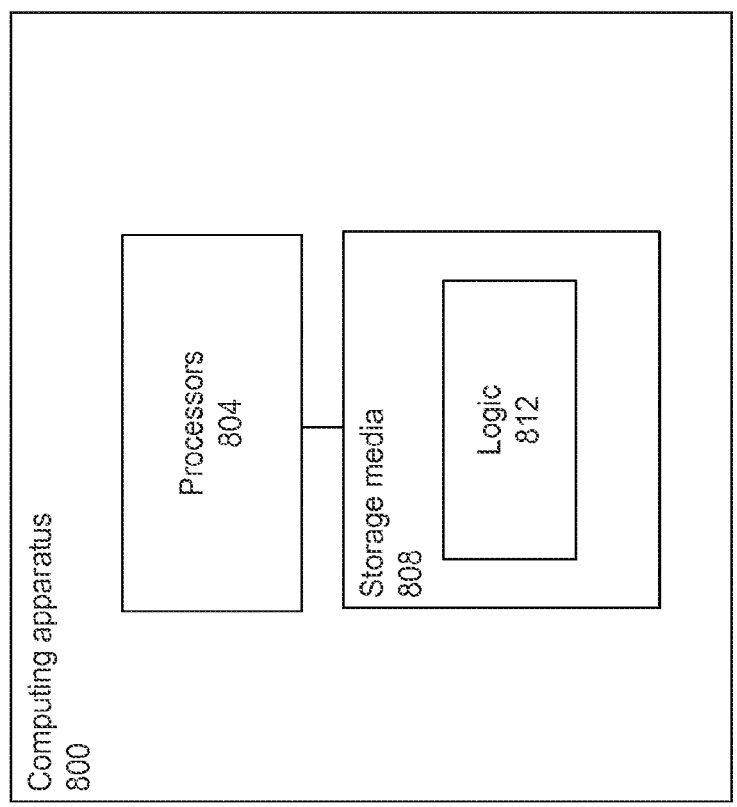
FIG. 8 illustrates a computing apparatus in accordance with some embodiments.

Embodiments described herein may be implemented into a system using any suitably configured hardware and/or software. FIG. 8 illustrates, for one embodiment, example components of a computing apparatus 800, which may comprise, or be part of, PCRF (for example, PCRF 132, PCRF 532, or PCRF 704), an SSF (for example, SSF 134, SSF 534, or SSF 708), or an orchestrator (for example, orchestrator 548 or orchestrator 712).

The computing apparatus 800 may include one or more processors 804 coupled with one or more storage media 808. The processors 804 may include one or more single-core or multi-core processors. The processors may include any combination of general-purpose processors and dedicated processors including, for example, digital signal processors (DSPs), central processing units (CPUs), microprocessors, memory controllers (integrated or discrete), etc.

The storage media 808 may be used to load and store data or instructions (collectively "logic 812") for operations performed by the processors 804. The storage media 808 may include any combination of suitable volatile memory and non-volatile memory. The storage media 808 may include any combination of various levels of memory/storage including, but not limited to, read-only memory (ROM) having embedded software instructions (e.g., firmware), random access memory (e.g., dynamic random access memory (DRAM)), cache, buffers, etc. The storage media 808 may be shared among the various processors or dedicated to particular processors.

In some embodiments, one or more of the processors 804 may be combined with one or more storage media 808 and, possibly other circuitry in a single chip, a single chipset, or disposed on a same circuit board in some embodiments.

The computing apparatus 800 may perform one or more of the operations described above with respect to the control circuitry (for example, control circuitry 720, control circuitry 728, or control circuitry 736) or with respect to the interface circuitry (for example, interface circuitry 716, interface circuitry 724, or interface circuitry 732).

Some non-limiting examples are provided below.

Example 1 includes one or more computer-readable media having instructions that, when executed, cause a service steering and control function (SSF) to: receive a service steering and control (SSC) rule, the SSC rule to include a service dataflow (SDF) identifier and one or more service enabler (SE) identifiers; identify a service dataflow (SDF) based on the SDF identifier within an operator network; and route the SDF through one or more service enablers in a (S)Gi-LAN based on the one or more SE identifiers.

Example 2 includes the one or more computer-readable media of example 1, wherein the SSF is to receive the SSC rule from a policy and charging rules function (PCRF), an access network discovery and selection function (ANDSF), a home subscriber server (HSS), or a subscriber profile repository (SPR).

Example 3 includes the one or more computer-readable media of example 1, wherein the instructions, when executed, further cause the SSF to: collect dynamic load status information from individual service enablers of the one or more service enablers; and transmit the dynamic load status information to a policy and charging rules function (PCRF).

Example 4 includes the one or more computer-readable media of example 1, wherein to route the SDF through one or more service enablers includes: cause the SDF to be transmitted through a chain of a plurality of service enablers in an order defined by the SSC rule.

Example 5 includes the one or more computer-readable media of example 4, wherein to cause the SDF to be transmitted through the chain includes: transmit data of the SDF to a first service enabler of the plurality of service enablers; receive the data of the SDF from the first service enabler; transmit, after receipt of the data of the SDF from the first service enabler, the data to a second service enabler of the plurality of service enablers.

Example 6 includes the one or more computer-readable media of example 1, wherein the SDF is an inbound dataflow.

Example 7 includes the one or more computer-readable media of example 1, wherein the SSC rule includes information to associate the SDF with the one or more service enablers and to provide an order through which packets of the SDF are to be transmitted through the one or more service enablers.

Example 8 includes the one or more computer-readable media of any one of examples 1-7, wherein the SSF is to route the SDF through the one or more service enablers using one or more layer-2 tunnels.

Example 9 includes an apparatus comprising: control circuitry to determine a service steering and control (SSC) rule to be applied to data traffic through an operator network; and interface circuitry, coupled with the control circuitry, to transmit the SSC rule to a service steering function (SSF) to facilitate enforcement of the SSC rule, wherein the SSC rule includes information to associate the data traffic with one or more service enablers in a (S)Gi-LAN.

Example 10 includes the apparatus of example 9, wherein: the interface circuitry is to receive dynamic load status information corresponding to at least one of the one or more service enablers; the control circuitry is to update the SSC rule based on the dynamic load status information; and the interface circuitry is to transmit the updated SSC rule to the SSF.

Example 11 includes the apparatus of example 9, wherein the interface circuitry is to receive the dynamic load status information from the SSF or from an orchestrator in the (S)Gi-LAN.

Example 12 includes the apparatus of example 9, wherein the control circuitry is to determine the SSC rule based on a user subscription profile associated with data traffic.

Example 13 includes the apparatus of example 9, wherein: the interface circuitry is to receive information corresponding to a change to a subscriber profile, an operator policy, or a network environment; the control circuitry is to update the SSC rule based on the information; and the interface circuitry is to transmit the updated SSC rule to the SSF.

Example 14 includes the apparatus of example 9, wherein: the interface circuitry is to receive information from an access network discovery and selection function (ANDSF), a home subscriber server (HSS), or a subscriber profile repository (SPR); and the control circuitry is to determine the SSC rule based on the information.

Example 15 includes the apparatus of example 9, wherein the SSC rule further includes information to provide an order through which packets of the data traffic are to be transmitted through the one or more service enablers.

Example 16 include the apparatus of example 9, wherein the apparatus comprises a policy and charging rules function (PCRF).

Example 17 includes the apparatus of any one of examples 9-16, wherein the SSC rule includes a rule identifier, a service dataflow identifier, a service enabler identifier, and an application identifier.

Example 18 includes one or more computer-readable media having instructions that, when executed, cause a device to: receive dynamic load status information from a plurality of service enablers in a (S)Gi-LAN; and transmit the dynamic load status information to a policy and charging rules function (PCRF).

Example 19 includes the one or more computer-readable media of example 18, wherein the device is an orchestrator in the (S)Gi-LAN and the instructions, when executed, further cause the orchestrator to transmit the dynamic load status information over an Rs interface.

Example 20 includes the one or more computer-readable media of example 18, wherein the device is a service steering and control function (SSF) and the instructions, when executed, further cause the SSF to: route a service dataflow through one or more service enablers of the plurality of service enablers based on a service steering and control (SSC) rule.

Example 21 includes the one or more computer-readable media of example 20, wherein the instructions, when executed, further cause the SSF to: receive the SSC rule from the PCRF.

Example 22 includes the one or more computer-readable media of example 20, wherein the SSC rule includes a rule identifier, a service dataflow identifier, a service enabler identifier, and an application identifier.

Example 23 includes one or more computer-readable media having instructions that, when executed, cause a policy and charging rules function (PCRF) to: determine a service steering and control (SSC) rule to be applied to data traffic through an operator network; and provide the SSC rule to a service steering function (SSF) to facilitate enforcement of the SSC rule, wherein the SSC rule includes information to associate the data traffic with one or more service enablers in a (S)Gi-LAN.

Example 24 includes the one or more computer-readable media of example 23, wherein the instructions, when executed, further cause the PCRF to: receive dynamic load status information corresponding to at least one of the one or more service enablers; update the SSC rule based on the dynamic load status information; and provide the updated SSC rule to the SSF.

Example 25 includes the one or more computer-readable media of example 24, wherein the PCRF is to receive the dynamic load status information from the SSF or from an orchestrator in the (S)Gi-LAN.

Example 26 includes the one or more computer-readable media of example 23, wherein the instructions, when executed, further cause the PCRF to: determine the SSC rule based on a user subscription profile associated with data traffic.

Example 27 includes the one or more computer-readable media of example 23, wherein the instructions, when executed, further cause the PCRF to: receive information corresponding to a change to a subscriber profile, an operator policy, or a network environment; update the SSC rule based on the information; and provide the updated SSC rule to the SSF.

Example 28 includes the one or more computer-readable media of example 23, wherein the instructions, when executed, further cause the PCRF to: receive information from an access network discovery and selection function (ANDSF), a home subscriber server (HSS), or a subscriber profile repository (SPR); and determine the SSC rule based on the information.

Example 29 includes the one or more computer-readable media of example 23, wherein the SSC rule further includes information to provide an order through which packets of the data traffic are to be transmitted through the one or more service enablers.

Example 30 includes the one or more computer-readable media of any one of examples 23-29, wherein the SSC rule includes a rule identifier, a service dataflow identifier, a service enabler identifier, and an application identifier.

Example 31 includes in apparatus comprising: interface circuitry to receive a service steering and control (SSC) rule, the SSC rule to include a service dataflow (SDF) identifier and one or more service enabler (SE) identifiers; and control circuitry to: identify a service dataflow (SDF) based on the SDF identifier within an operator network; and route the SDF through one or more service enablers in a (S)Gi-LAN based on the one or more SE identifiers.

Example 32 includes the apparatus of example 31, wherein the interface circuitry is to receive the SSC rule from a policy and charging rules function (PCRF), an access network discovery and selection function (ANDSF), a home subscriber server (HSS), or a subscriber profile repository (SPR).

Example 33 includes the apparatus of example 31, wherein: the control circuitry is to collect dynamic load status information from individual service enablers of the one or more service enablers; and the interface circuitry is to transmit the dynamic load status information to a policy and charging rules function (PCRF).

Example 34 includes the apparatus of example 31, wherein to route the SDF through one or more service enablers the control circuitry is to cause the SDF to be transmitted through a chain of a plurality of service enablers in an order defined by the SSC rule.

Example 35 includes the apparatus of example 34, wherein to cause the SDF to be transmitted through the chain the control circuitry is to cause the interface circuitry to: transmit data of the SDF to a first service enabler of the plurality of service enablers; and transmit, after receipt of the data of the SDF from the first service enabler, the data to a second service enabler of the plurality of service enablers.

Example 36 includes the apparatus of example 31, wherein the SDF is an inbound dataflow.

Example 37 includes the apparatus of example 31, wherein the SSC rule includes information to associate the SDF with the one or more service enablers and to provide an order through which packets of the SDF are to be transmitted through the one or more service enablers.

Example 38 includes the apparatus of any one of examples 31-37, wherein the SSF is to route the SDF through the one or more service enablers using one or more layer-2 tunnels.

Example 39 includes a method comprising: receiving a service steering and control (SSC) rule, the SSC rule to include a service dataflow (SDF) identifier and one or more service enabler (SE) identifiers; identifying a service dataflow (SDF) based on the SDF identifier within an operator network; and routing the SDF through one or more service enablers in a (S)Gi-LAN based on the one or more SE identifiers.

Example 40 includes the method of example 39, wherein the SSC rule is received from a policy and charging rules function (PCRF), an access network discovery and selection function (ANDSF), a home subscriber server (HSS), or a subscriber profile repository (SPR).

Example 41 includes the method of example 39, further comprising: collecting dynamic load status information from individual service enablers of the one or more service enablers; and transmitting the dynamic load status information to a policy and charging rules function (PCRF).

Example 42 includes the method of example 39, wherein routing the SDF through one or more service enablers includes: causing the SDF to be transmitted through a chain of a plurality of service enablers in an order defined by the SSC rule.

Example 43 includes the method of example 42, wherein causing the SDF to be transmitted through the chain includes: transmitting data of the SDF to a first service enabler of the plurality of service enablers; receiving the data of the SDF from the first service enabler; transmitting, after receipt of the data of the SDF from the first service enabler, the data to a second service enabler of the plurality of service enablers.

Example 44 includes the method of example 39, wherein the SDF is an inbound dataflow.

Example 45 includes the method of example 39, wherein the SSC rule includes information to associate the SDF with the one or more service enablers and to provide an order through which packets of the SDF are to be transmitted through the one or more service enablers.

Example 46 includes the method of any one of examples 39-45, wherein routing the SDF through the one or more service enablers comprises routing the SDF using one or more layer-2 tunnels.

Example 47 includes a method comprising: receiving dynamic load status information from a plurality of service enablers in a (S)Gi-LAN; and transmitting the dynamic load status information to a policy and charging rules function (PCRF).

Example 48 includes the method of example 47, further comprising transmitting the dynamic load status information over an Rs interface.

Example 49 includes the method of example 47, further comprising: routing a service dataflow through one or more service enablers of the plurality of service enablers based on a service steering and control (SSC) rule.

Example 50 includes the method of example 49, further comprising: receiving the SSC rule from the PCRF.

Example 51 includes a method comprising: determining a service steering and control (SSC) rule to be applied to data traffic through an operator network; and transmitting the SSC rule to a service steering function (SSF) to facilitate enforcement of the SSC rule, wherein the SSC rule includes information to associate the data traffic with one or more service enablers in a (S)Gi-LAN.

Example 52 includes the method of example 51, further comprising: receiving dynamic load status information corresponding to at least one of the one or more service enablers; updating the SSC rule based on the dynamic load status information; and transmitting the updated SSC rule to the SSF.

Example 53 includes the method of example 52, wherein the dynamic load status information is received from the SSF or from an orchestrator in the (S)Gi-LAN.

Example 54 includes the method of example 51, further comprising: determining the SSC rule based on a user subscription profile associated with data traffic.

Example 55 includes the method of example 51, further comprising: receiving information corresponding to a change to a subscriber profile, an operator policy, or a network environment; updating the SSC rule based on the information; and transmitting the updated SSC rule to the SSF.

Example 56 includes the method of example 51, further comprising: receiving information from an access network discovery and selection function (ANDSF), a home subscriber server (HSS), or a subscriber profile repository (SPR); and determining the SSC rule based on the information.

Example 57 includes the method of example 51, wherein the SSC rule further includes information to provide an order through which packets of the data traffic are to be transmitted through the one or more service enablers.

Example 58 includes an apparatus comprising means to perform any one of methods of examples 39-57.

Example 59 includes the one or more computer-readable media of any one of examples 20-22, wherein the SSC rule can be part of Policy and Charging Control (PCC) rule or Application Detection and Control (ADC) rule.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. One or more non-transitory, computer-readable media having instructions that, when executed, cause a service steering and control function (SSF) to:
   obtain a service steering and control (SSC) rule from a policy charging and rules function (PCRF), the SSC rule to include an SSC rule identifier, one or more service enabler (SE) identifiers, and a service dataflow (SDF) identifier that comprises an Internet protocol (IP) 5-tuple that has a source IP address, a destination IP address, a source port number, a destination port number, and a protocol, wherein the SSC rule is part of a Policy and Charging Control (PCC) rule or an Application Detection and Control (ADC) rule;
   identify, based on the SDF identifier, traffic within an operator network; and
   route the traffic through one or more service enablers in a (S)Gi-local area network (LAN) based on the one or more SE identifiers.

2. The one or more non-transitory, computer-readable media of claim 1, wherein the SSF is implemented separately from a policy and charging enforcement function (PCEF) and a traffic detection function (TDF).

3. The one or more non-transitory, computer-readable media of claim 1, wherein the SSC rule is to include an application identifier.

4. The one or more non-transitory, computer-readable media of claim 1, wherein to route the traffic through one or more service enablers includes:
   cause the traffic to be transmitted through a chain of a plurality of service enablers in an order defined by the SSC rule.

5. The one or more non-transitory, computer-readable media of claim 4, wherein to cause the traffic to be transmitted through the chain includes:
   transmit data of the traffic to a first service enabler of the plurality of service enablers;
   receive the data of the traffic from the first service enabler;
   transmit, after receipt of the data of the traffic from the first service enabler, the data to a second service enabler of the plurality of service enablers.

6. The one or more non-transitory, computer-readable media of claim 1, wherein the SSF is implemented in a policy and charging enforcement function (PCEF) or a traffic detection function (TDF).

7. The one or more non-transitory, computer-readable media of claim 1, wherein the SSC rule includes information to associate the traffic with the one or more service enablers and to provide an order through which packets of the traffic are to be transmitted through the one or more service enablers.

8. The one or more non-transitory, computer-readable media of claim 1, wherein the SSF is to route the traffic through the one or more service enablers using one or more layer-2 tunnels.

9. An apparatus comprising:
control circuitry to determine a service steering and control (SSC) rule to be applied to data traffic through an operator network; and
interface circuitry, coupled with the control circuitry, to transmit the SSC rule to a service steering function (SSF) to facilitate enforcement of the SSC rule, wherein the SSC rule includes information to associate the data traffic with one or more service enablers (SEs) in a (S)Gi-local area network (LAN), the information to include an SSC rule identifier, one or more SE identifiers, and a service dataflow (SDF) identifier that comprises an Internet protocol (IP) 5-tuple that has a source IP address, a destination IP address, a source port number, a destination port number, and a protocol, wherein the SSC rule is part of a Policy and Charging Control (PCC) rule or an Application Detection and Control (ADC) rule.

10. The apparatus of claim 9, wherein:
the interface circuitry is to receive dynamic load status information corresponding to at least one of the one or more service enablers;
the control circuitry is to update the SSC rule based on the dynamic load status information; and
the interface circuitry is to transmit the updated SSC rule to the SSF.

11. The apparatus of claim 9, wherein the interface circuitry is to receive the dynamic load status information from the SSF or from an orchestrator in the (S)Gi-LAN.

12. The apparatus of claim 9, wherein the control circuitry is to determine the SSC rule based on a user subscription profile associated with data traffic.

13. The apparatus of claim 9, wherein:
the interface circuitry is to receive information corresponding to a change to a subscriber profile, an operator policy, or a network environment;
the control circuitry is to update the SSC rule based on the information; and
the interface circuitry is to transmit the updated SSC rule to the SSF.

14. The apparatus of claim 9, wherein:
the interface circuitry is to receive information from an access network discovery and selection function (ANDSF), a home subscriber server (HSS), or a subscriber profile repository (SPR); and
the control circuitry is to determine the SSC rule based on the information.

15. The apparatus of claim 9, wherein the SSC rule further includes information to provide an order through which packets of the data traffic are to be transmitted through the one or more service enablers.

16. The apparatus of claim 9, wherein the apparatus comprises a policy and charging rules function (PCRF).

17. The apparatus of claim 9, wherein the SSC rule includes an application identifier.

18. One or more non-transitory, computer-readable media having instructions that, when executed, cause a device to:
receive dynamic load status information from a plurality of service enablers in a (S)Gi-local area network (LAN); and
transmit the dynamic load status information to a policy and charging rules function (PCRF), wherein the device is an orchestrator in the (S)Gi-LAN and the instructions, when executed, further cause the orchestrator to transmit the dynamic load status information over an Rs interface.

19. The one or more non-transitory, computer-readable media of claim 18, wherein the device is a service steering and control function (SSF) and the instructions, when executed, further cause the SSF to:
route a service dataflow through one or more service enablers of the plurality of service enablers based on a service steering and control (SSC) rule.

20. The one or more non-transitory, computer-readable media of claim 19, wherein the instructions, when executed, further cause the SSF to:
receive the SSC rule from the PCRF.

21. The one or more non-transitory, computer-readable media of claim 19, wherein the SSC rule includes a rule identifier, a service dataflow identifier or an application identifier, and one or more service enabler identifiers and an order associated with the one or more service enabler identifiers.

22. An apparatus to implement a service steering and control function (SSF), the apparatus comprising:
means for receiving a service steering and control (SSC) rule from a policy charging and rules function (PCRF), the SSC rule to include an SSC rule identifier, one or more service enabler (SE) identifiers, and a service dataflow (SDF) identifier that comprises an Internet protocol (IP) 5-tuple that has a source IP address, a destination IP address, a source port number, a destination port number, and a protocol, wherein the SSC rule is part of a Policy and Charging Control (PCC) rule or an Application Detection and Control (ADC) rule;
means for identifying, based on the SDF identifier, traffic within an operator network; and
means for steering the traffic through one or more service enablers in a (S)Gi-local area network (LAN) based on the one or more SE identifiers.

23. The apparatus of claim 22, wherein the apparatus does not implement a policy and charging enforcement function (PCEF) or a traffic detection function (TDF).

24. The apparatus of claim 22, wherein the apparatus further comprises:
means for collecting dynamic load status information from individual service enablers of the one or more service enablers; and
means for transmitting the dynamic load status information to a policy and charging rules function (PCRF).

25. The apparatus of claim 22, wherein the means for steering the traffic through one or more service enablers is to cause the traffic to be transmitted through a chain of a plurality of service enablers in an order defined by the SSC rule.

26. The apparatus of claim 22, wherein the apparatus is further to implement a policy and charging enforcement function (PCEF) or a traffic detection function (TDF).

27. The apparatus of claim 22, wherein the SSC rule includes information to associate the traffic with the one or more service enablers and to provide an order through which packets of the traffic are to be transmitted through the one or more service enablers.

* * * * *